Oct. 27, 1931.  R. H. EAGLES  1,829,395
FINELY DIVIDED METALLIC COMPOUNDS AND PROCESS THEREFOR
Filed Jan. 11, 1927
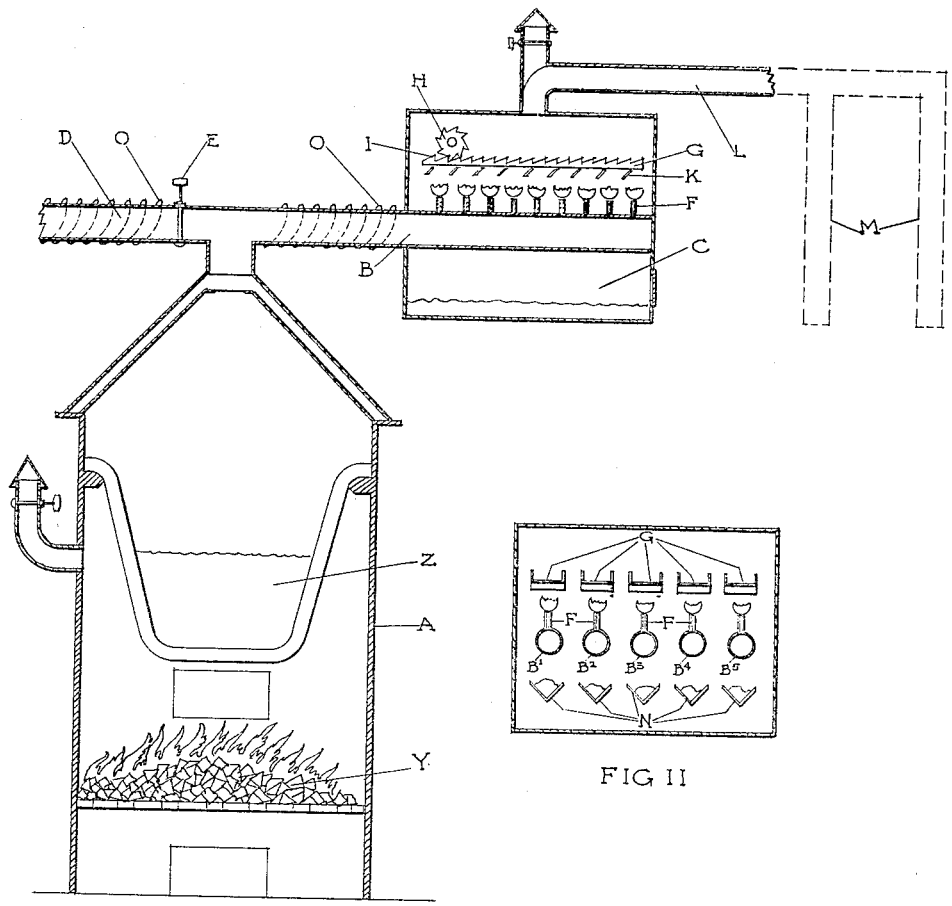
FIG I
FIG II
REGINALD H. EAGLES.
INVENTOR
BY Charles J. Holland
ATTORNEY Patented Oct. 27, 1931

1,829,395

UNITED STATES PATENT OFFICE

REGINALD H. EAGLES, OF HASTINGS-ON-HUDSON, NEW YORK

FINELY DIVIDED METALLIC COMPOUNDS AND PROCESS THEREFOR

Application filed January 11, 1927. Serial No. 160,392.

My invention relates to the production of finely divided metallic compounds and more particularly to the production of finely divided oxides of lead and zinc.

It is an object of the present invention to provide such metallic compounds in a form suitable for use as pigments. It is a further object to produce pigments of improved covering power, when used for paints, and such as will impart a much increased resistance to wear when they are used as fillers for rubber products.

It is well known that finely divided solids may be produced either by the condensation of sublimed vapors as in the manufacture of sublimed lead, or by the condensation of the solid products of combustion from any burning vapors as in the manufacture of zinc oxide. The usual method of manufacture of these compounds as at present practiced is to permit the highly concentrated vapor to condense or precipitate in a more or less unrestricted volume and to collect the resulting solid particles in a somewhat cooled condition by entraining with a fabric of some kind (such as is done in the bag process for collecting zinc oxide), or, by deposition in settling chambers, or, by electrostatic precipitation.

It has been the usual practice in present processes to bring the vapors to a concentrated condition just prior to the precipitation or condensation when the molecules or atoms are in transition from the gaseous to the solid state. This has a tendency to force the particles to determine into spheroidal form, and since they cool and pass on into the collection apparatus in this form, they remain thus in the finished product.

The efficiency of any pigment or filler is largely dependent upon the fineness of division of its particles and the shape thereof. In paints, for example, the surface area represented by a given volume of particles determines its relative value in covering power. A particle of irregular contour will present more covering power efficiency than a spheroidal particle of the same relative size and specific gravity. Similarly, in the reenforcement of rubber and rubber products to produce resistance to wear, a particle of irregular contour will "anchor" into the rubber with better effect than a smooth surfaced or spheroidal particle, and will have a more beneficial effect.

I have discovered that many of the well known pigments and fillers may be produced in a form in which the particles are much more finely divided and of much more irregular shape than is the case with similar products made according to present processes. I have further discovered a process of precipitation and collection of metallic compounds whereby the size and shape of the particles can be controlled during manufacture so as to result in a product of greater utility than at present is the case.

In applying my invention, I begin with any solid or liquid containing the desired metal that can be volatilized into a gaseous form that is either condensible per se, or, that can be made condensible by total or partial combustion in the presence of oxygen. I volatilize the metal and dilute the vapors with another gas in greater or less proportions thus varying the concentration of the metallic vapors. My means hereinafter described I cause these solid particles to deposit by impingement against a relatively cooler surface positioned in or near the region of precipitation or condensation. The deposited particles can then be removed by any suitable means.

My invention may be more clearly understood from the drawings to which reference is now made.

Fig. I represents schematically a suitable apparatus for carrying out the process of my invention applied to the manufacture of zinc oxide.

Fig. II represents schematically the deposition chamber of this apparatus viewed at right angles to the view in Fig. I and illustrates one method by which the deposited or collected product may be conveyed out of the apparatus.

In Fig. I, A is an ordinary furnace retort. A bed of fuel, $y$, heats a charge of metallic zinc introduced into the retort, $z$. The retort is connected with a pipe or duct, B, which extends into the deposition chamber, C supplied with atmospheric air. A dilution duct, D, adapted to admit gases for the dilution of the metallic vapors connects with the duct, B, the admission of the diluting gases being controlled by the valve, E. Affixed to the portion of the duct, B, which is within the deposition chamber, C, is a row of burner tips, F. A metallic impingement plate, G, is positioned above the tips, F. This plate, G, may conveniently be of steel and may be so mounted as to be actuated by a slow reciprocating motion through a mechanism consisting of the geared wheel, H, and the gear, I, on the impingement plate, G. Scrapers, K, contacting with the impingement plate, G, on its under side, are mounted so as to remove the deposited material. I have shown in the drawing an additional duct, L, leading from the deposition chamber, C, to the fabric bags, M, shown in dotted lines to indicate a means of conducting away the zinc vapors which may have escaped impingement with the plate K, and which may be collected by precipitation in solid particles as oxide in the bags, M, in a well known manner. Provision for electrically heating the ducts, B and D, is made by the heating coils O.

In Fig. II, I have shown schematically an end view of the deposition chamber at right angles to the view thereof shown in Fig. I. In this view it will be noted that the portion of the duct, B, within the deposition chamber is shown divided into a plurality of branches, $B^1$, $B^2$, $B^3$, $B^4$ and $B^5$ each with a row of burner tips, F, mounted thereon and an impingement plate, G, positioned above the burners. Below each branch duct, is a conveyor, N, to receive the product as it is removed from the impingement plates and to carry it away.

The operation of my process begins with the volatilization of a material, such as zinc in metallic form. This is effected in the retort furnace, A. Heat is furnished by the burning fuel, $y$, in the furnace and is maintained at a temperature above 700° C. A charge of pure metallic zinc is placed in the retort, $z$, and boiled. Instead of pure metallic zinc other zinc compounds may be used or the charge may be of zinc ore, in which case the ore may be reduced to the metal and vaporized in the same operation. The resulting vapors are then carried by their own pressure into and through the duct, B, or their progress may be aided by a carrying gas admitted through the valve, E, or by a forced draft.

An important feature of the invention is the control of the concentration of the zinc vapors which are to be precipitated or condensed, in order to produce the optimum conditions for obtaining the smallest sized particles in the ultimate product. I accomplish this by dilution of the metallic vapors with other gases, the proportion of the diluting gas to the metallic vapors governing the size of the particles in the finished product. The dilution may be effected in a number of ways. An inert gas, for example, may be admitted to the duct, B, from the dilution duct, D, through the valve E. Dilution may be effected also by providing a very large number of orifices on the portion of the duct, B, that is within the deposition chamber C. A very effective dilution occurs, for instance, where the duct, B, is a pipe of about 10 inches diameter, and is divided into a number of branches within the deposition chamber sufficient to accommodate several hundred orifices which discharge into the deposition chamber atmosphere. I may use either or both these methods of dilution, it being understood that the greater the dilution of the metallic vapors, within reasonable limits, the smaller the size of the particle in the ultimate product. The inert gas used as a diluent may be any of those commonly used such as carbon dioxide, the products of combustion from the deposition chamber C or the like.

In some case, where the precipitation is to be effected by means of total or partial combustion of the mixed gas and zinc vapors, instead of an inert gas, I introduce a combustible gas through the valve, E. This serves the double purpose of providing a suitable dilution and of assisting in the combustion.

The coils, O, wound about the ducts, B and D, serve to maintain the gas and vapor mixture at a temperature above the volatilization temperature of the zinc until it reaches the burners, F, in the deposition chamber, C. This heating prevents any precipitation or condensation within the duct, B.

The gaseous mixture passes through the duct, B, to the burners, F, where it is ignited and the zinc vapors in the mixture are thus oxidized. While the zinc oxide particles are in the transition state from gas to solid in the region between the burners and the plate G, they impinge with considerable velocity against the plate, G, which is relatively cooler and upon which the solid particles deposit. The plate, G, moves slowly back and forth over the burners, F, being actuated by the reciprocating gears, H and I, and as it moves the scrapers, K, which are stationary scrape the zinc oxide from the plates, G. The oxide then falls to the bottom of the deposit chamber or into the conveyors, N, at the bottom as shown in Fig. II.

The product thus obtained is of a very finely divided nature, the particles being far more minute than is the case with the product of the present processes. Furthermore, the deposited particles have an irregular shape instead of the spheroidal shape of the product of the present processes, which is probably due to the fact that they have been caused to impinge violently against the relatively cooler surface of the steel plate at the instant of condensation from the gaseous to the solid state.

As a certain amount of the precipitated solids will escape around the plates, G, without impinging thereon, suitable means for their collection may be provided, such as the duct, L, and the bags, M.

While I have illustrated my invention by showing its application to the production of zinc oxide, it is to be understood that it is equally applicable to the production of lead oxide and other finely divided metallic compounds.

Having thus described my invention what I claim is:—

1. The process of producing irregularly shaped metallic compound particles which comprises diluting metallic vapors with a suitable gas, burning said diluted vapors and causing the products of such combustion to impinge upon a relatively cooler surface while said products of combustion are in a state of transition from the gaseous to the solid state.

2. The process of producing finely divided metallic compounds which comprises the burning of a diluted metallic vapor, controlling the size of the particles of the product by the proportions of the diluent to the metallic vapors in the mixture and causing said particles to assume an irregular shape by depositing them by impingement against a relatively cooler surface positioned in the region of condensation of said particles.

3. The process of producing finely divided zinc oxide which comprises the vaporization of zinc, the dilution of said vapors with another gas in such manner as to control the concentration of the metallic vapors so as to attain the optimum conditions for producing the smallest sized particles in the finished product; burning said vapors and causing the products of said burning to impinge against a relatively cool surface in the region of condensation of the metallic vapors to the condition of solid particles and giving said particles an irregular shape by such impingement.

In witness whereof, I have subscribed my name hereto this 7th day of January, 1927.

REGINALD H. EAGLES.